US006173829B1

(12) United States Patent
Jackson et al.

(10) Patent No.: US 6,173,829 B1
(45) Date of Patent: Jan. 16, 2001

(54) CIRCULATING PADDLE POSITIONING FENCE WITH FLEXIBLE TRACK

(75) Inventors: James G. Jackson; James B. Hannebauer, both of Salmon Arm (CA)

(73) Assignee: CAE Electronics Ltd., St. Laurent (CA)

( * ) Notice: Under 35 U.S.C. 154(b), the term of this patent shall be extended for 0 days.

This patent is subject to a terminal disclaimer.

(21) Appl. No.: 09/302,250

(22) Filed: Apr. 30, 1999

(30) Foreign Application Priority Data

May 1, 1998 (CA) ........................................ 2236508

(51) Int. Cl.[7] ........................................ B65G 47/26

(52) U.S. Cl. .................. 198/456; 144/245.1; 144/245.2; 144/242.1; 144/250.23

(58) Field of Search ......................... 198/456; 144/245.1, 144/250.23, 245.2, 242.1

(56) References Cited

U.S. PATENT DOCUMENTS

| | | | | |
|---|---|---|---|---|
| 5,685,410 | * | 11/1997 | Ritola et al. | 198/457 |
| 5,785,102 | * | 7/1998 | Hamel | 144/387 |
| 5,816,302 | * | 10/1998 | Newnes | 144/357 |
| 5,853,038 | * | 12/1998 | Newnes | 144/357 |
| 5,865,080 | * | 2/1999 | Jackson | 83/74 |
| 5,884,682 | * | 3/1999 | Kennedy et al. . | |
| 5,911,302 | * | 6/1999 | Jackson | 198/456 |
| 5,984,301 | * | 11/1999 | Holbert et al. | 271/227 |
| 5,992,484 | * | 11/1999 | Jackson | 144/245.1 |
| 6,008,476 | * | 12/1999 | Neiconi et al. | 219/388 |
| 6,039,098 | * | 3/2000 | Kennedy et al. | 0/55.19 |
| 6,056,543 | * | 5/2000 | Taricco | 432/239 |

* cited by examiner

*Primary Examiner*—Christopher P. Ellis
*Assistant Examiner*—Jeffrey A. Shapiro
(74) *Attorney, Agent, or Firm*—Antony C. Edwards

(57) ABSTRACT

The board positioning device of the present invention is for optimally longitudinally positioning a board for trimming. The board is translated from an upstream position to a downstream position in a first direction towards the trimming saws. The board translates at a translation speed on a board translating device such as a lugged transfer chain. The board while translating in the first direction, is aligned longitudinally, that is, along its length, in a second direction perpendicular to the first direction so as to position the board relative to the saws. The board is urged by board ending means, such as ending rolls, in the second direction against a corresponding board positioning member, such as a shaft mounted paddle, on the board positioning device. In the preferred embodiment, the first and second directions lie in a generally horizontal plane. The selectively actuable first flexible guide member is rigidly mounted at an upstream end thereof to, or adjacent to, a downstream end of a rigid fence extending parallel to the first direction. The selectively actuable flexible guide member may be selectively actuated to form a curved guide. The curved path for following by the board positioning member is correspondingly curved to correspond to the curved form of the guide in the generally horizontal plane. The board positioning member translating means is a flexible rotatable member rotating in a generally vertical plane generally perpendicular to the generally horizontal plane and generally perpendicular to the second direction. The board positioning member is perpendicularly slideably mounted to the flexible rotatable member for selective sliding in the second direction. The flexible rotatable member rotates in the vertical plane so as to translate, in the first direction, the board positioning member substantially in the horizontal plane when cooperatively aligned with the board.

12 Claims, 6 Drawing Sheets

CIRCULATING PADDLE POSITIONING FENCE WITH FLEXIBLE TRACK

FIELD OF THE INVENTION

This invention relates to a board positioning fence for lumber trimmers, and in particular to a circulating paddle, board positioner with a flexible fence for following the trajectory of the end of the boards as the boards are ended and positioned.

BACKGROUND OF THE INVENTION

In a typical lumber mill or planer mill, each board is oriented transversely on a lugged transfer moving laterally towards the trimmer. Typically, the lugs on the transfer are evenly spaced at precise intervals. The boards are passed through an electronic scanner which determines the shape of each board and sends the shape information to an optimizer. The optimizer in turn sends the information to a controller. The controller adjusts a positioning fence and activates saws above a trimmer saw deck to trim the board in an attempt to maximize lumber utilization. Typically saws are spaced one foot apart or conversely two feet apart, so that depending upon the particular mill setup and the physical defects of a board, two feet of each end of the board could potentially be trimmed and thus wasted if the trim target is missed, this results in considerable wastage of useful wood and loss of profits.

In order to minimize such wastage, board positioners were developed utilizing a plurality of parallel rollers, or ending rolls, which are driven in a direction at right angle to the transfer deck, thus moving the ends of the boards up to a positioning fence. When on the rollers, the boards are continually thrust laterally across the transfer deck, until the board is raised above the rollers by a plurality of lift skids to disengage the board from the rollers at a predetermined place. Such prior art devices have the disadvantage that when wet or icy boards are being ended, slippage of the boards can cause a jerking movement in a manner which will cause chattering and bouncing of the boards on the ending fence and when the lift skids lift the board at the predetermined ending position, inaccuracies result. As well, the lift skids are complex, each requiring an activation cylinder and there is an extra control system needed to raise each skid group in time with the lugged transfer chains along the length of the ending fence as needed and if applicable, extending along the stages of the ending fence.

Such devices suffer from the fact that tapered ends of boards abutting the positioning fence can be so structurally weak as to collapse or break when contacting (bouncing, chattering) and sliding along the fence. Because the board was scanned and optimized based on the inclusion of the tapered ends, if the end is broken off, the optimized lengthwise movement of the board can be overshot as the broken board is ended against the positioning fence, resulting in a board that is over trimmed.

It is therefore an object of the present invention to provide a board positioning device which can gently and accurately position selected boards for trimming at a higher rate of speed than prior art devices and without damage or collapse of the board's weak ends, so as to thus provide an improvement in accuracy for optimally trimming boards.

In another problem with most existing apparatus of the general type, the setting of each board in sequence limits the time available to reset the next piece, also as speeds increase, more stages are added to allow for greater ending. This results in a longer installed length, and is therefor more difficult to retrofit, in addition as mentioned a multiple number of lift skids, which attempt to hold the boards position after ending, are needed in most board positioners which adds to the number of moving parts and the controls needed to operate these lift skids are also increased.

It is therefor another object of the present invention to provide an apparatus that will not require additional space and to also eliminate the need for lift skids and the controls needed to operate the lift skids in sequence with the lugged transfer chains.

SUMMARY OF THE INVENTION

The circulating paddle positioning fence with an adjustable flexible track comprises a plurality of circulating positioning paddles which are slidably mounted on a pair of parallel circulating chains mounted adjacent a trimmer transfer, where the trimmer transfer has lugged transfer chains. There are a plurality of ending rolls within the trimmer transfer which urge the boards towards an ending fence. The ending fence is mounted at the upstream end of the ending rolls. A board is ended up against the ending fence and then, as the board is translated downstream, the board is handed off to a corresponding circulating paddle when the circulating paddle is at its fully extended position. The ending rolls continue to urge the board towards the positioning paddles along the length of the positioning fence.

The positioning paddles are mounted on shafts, sleeves or slides which are slidably mounted on the circulating chains to allow lateral adjustment of the paddles as the paddles move with the flow of the boards. The boards are translated in the lug spaces on the trimmer transfer chains. The positioning paddles are circulating at the same speed as the trimmer transfer chains.

The paddles mounted to the shafts are positioned by the contact of a pair of side by side followers, mounted in close proximity to each other and mounted on to the shaft, with a closed-loop track consisting of rigid and flexible segments. From an upstream position, the followers first follow along a fixed track segment as the paddles come around to meet a corresponding board. The followers then follow a flexible track segment to cause the paddles to follow an adjustable configurable displacement curve. The rigid and flexible tracks are mounted between the pair of circulating chains. The fixed track segment is mounted at the upstream end of the circulating paddle positioning fence. The upstream end of the flexible track segment is attached to the downstream end of the fixed track segment. The fixed track is mounted to coincide so that the followers on the paddle shaft and the paddles move laterally to meet and pick up boards from the ending fence at the lumberline. The paddles are extended to their maximum when the paddles take over the end of a board from the ending fence. The end of the board follows the paddle downstream to the end of the circulating paddle board positioning apparatus.

To help ensure that the end of the boards maintain contact with the paddles, as the boards are urged by the ending rolls concurrently towards the trimmer and laterally towards the paddle, the flexible track forms a specific curve that helps the boards follow the path of the paddle. To help in forming the shape of the curve the flexible track takes, there may be a fixed shaped curve form mounted behind the flexible track where the flexible track connects to the fixed track. As the flexible track is adjusted by moving its downstream end to its predetermined position, the curved form backs onto the flexible track (just below the path of the followers) to help shape the flexible track to approximate the trajectory of the end of the board as the board is ended by the paddle as the paddle is translating to follow the shape of the flexible track.

The flexible track may be made of a spring steel band or other flexible material. The second end of the flexible track is then slidably attached to a lineal actuated trolley, where the trolley is activated by a setworks so as to adjust the trolley and thus the flexible track to a predetermined position as set by an optimized system for trimming the board to the desired length. The optimizer control system tracks the board from the scanner outfeed, so that the corresponding circulating paddle may be adjusted to position the board on the lugged transfer.

The paddle is positioned to set the board end for trimming by adjusting the trolley. The paddle followers such as pairs of rollers, then follow along the flexible track which has been conformed to its desired shape and ending position. The paddle followers will first follow the fixed track, then the attached flexible track, then a third track, a rigid track loop attached to the trolley at the outfeed end of the positioning paddle apparatus. The rigid track allows the followers and thus the paddles to hold their position as the board position is set and as the board moves off of the ending rolls and clear of the positioning paddles. The paddles then circulate down to come around again for the next coinciding board.

The flexible track is slidably attached to the trolley by a means which allows the flexible track to be free to move into and out of the trolley while still being able to flex, thus giving a smooth transitional track for the followers to move from the flexible track onto the trolley and then onto the ridged track and the followers move along and circulate around.

The rigid track is fixed to the trolley and rounds down on the outfeed end of the apparatus to coincide with the sprockets that the circulating chains are running on, so that the paddle, it's shaft and followers, circulate around and follow the rigid track. There is also a corresponding flexible track at the underside of the circulating paddle apparatus where the paddles with attached shafts and followers circulate around and return to start back again on the first fixed track at the lumberline, as the paddles circulate around and up to the ending fence again to meet the next coinciding board in it's lug space, at the lumberline as the process continuously repeats.

The paddles may be mounted to a slidable sleeve which is mounted to shafts that are circulating on the pair of circulating chains. This configuration is preferable in most applications as it allows the circulating paddle apparatus to be mounted in closer and under the top of the trimmer transfer, as well as giving a better bearing surface and less movable mass for quicker positioning response time.

There may be more than one trolley and track unit within the same pair of circulating chains, depending on the chain spacings, the feed speeds and the ending maximum needed.

In summary, the board positioning device of the present invention is for optimally longitudinally positioning a board for trimming. The board is translated from an upstream position to a downstream position in a first direction towards the trimming saws. The board translates at a translation speed on a board translating device such as a lugged transfer chain. The board while translating in the first direction, is aligned longitudinally, that is, along its length, in a second direction perpendicular to the first direction so as to position the board relative to the saws. The board is urged by board ending means, such as ending rolls, in the second direction against a corresponding board positioning member, such as a shaft mounted paddle, on the board positioning device. In the preferred embodiment, the first and second directions lie in a generally horizontal plane.

The board positioning device includes a selectively actuable first flexible guide member such as an elongate flexible fence, cooperating with the board positioning member for selectively actuably guiding and positioning, in the second direction the board positioning member. A board positioning member translating means, such as a chain or the like, translates the board positioning member in generally the first direction at the translation speed, along a curved path tangentially parallel to the selectively actuable first flexible guide member, the board positioning member in cooperative alignment with the board so as to align, and maintain alignment of, the board positioning member with the board. The board is urged against the board positioning member by the board ending means and the board positioning member is selectively positioned in the second direction by the selectively actuable first flexible guide member to a board optimizing position to thereby selectively position the board at an optimized board position predetermined by optimization means cooperating with the selectively actuable guide member.

The selectively actuable first flexible guide member is rigidly mounted at an upstream end thereof to, or adjacent to, a downstream end of a rigid fence extending parallel to the first direction. The selectively actuable flexible guide member may be selectively actuated to form a curved guide. The curved path for following by the board positioning member is correspondingly curved to correspond to the curved form of the guide in the generally horizontal plane. The board positioning member translating means is a flexible rotatable member rotating in a generally vertical plane generally perpendicular to the generally horizontal plane and generally perpendicular to the second direction The board positioning member is perpendicularly slideably mounted to the flexible rotatable member for selective sliding in the second direction. The flexible rotatable member rotates in the vertical plane so as to translate, in the first direction, the board positioning member substantially in the horizontal plane when cooperatively aligned with the board.

The board is urged in the second direction between a board positioning member engaging position, wherein the board is urged against the board positioning member when the board positioning member is in a first upstream contact position, and the optimized board position.

The board positioning member has a guide member engaging means for slideably coupling, by coupling means, the board positioning member to the selectively actuable first flexible guide member, and in particular to an edge of the selectively actuable first flexible guide member. This edge, which may be an upper edge, lies generally in the horizontal plane. The coupling means guides positioning of the board positioning member in the second direction by slideable coupling of the coupling means to the edge of the selectively actuable first flexible guide member while the board positioning member is being carried in the first direction generally in the horizontal plane by the rotation of the flexible rotatable member.

As the board positioning member is carried by the flexible rotatable member, the coupling means slidably couples with a rigid track. The rigid track is contiguous to the edge of the first flexible guide member and curved out of the horizontal plane so as to define a closed loop track in the vertical plane. The coupling means slides firstly along the edge of the selectively actuable first flexible guide member and subsequently along the rigid track in the closed loop track as the board positioning member is carried by the flexible rotatable member out of generally the horizontal plane by the rotation of the flexible rotatable member in the vertical plane.

Means are provided for returning the board positioning member from the board optimizing position to the first contact position as the board positioning member is rotated by the flexible rotatable member in the vertical plane around the closed loop track to the upstream position adjacent the rigid fence. In the preferred embodiment the means for returning the board positioning member from the optimized board position to the first contact position is a second flexible guide member, mounted parallel to, spaced apart from, the first flexible guide member, for slideable engagement thereon of the board positioning member. Once the board positioning member has been carried by the flexible rotatable member rotating in the vertical plane in the first direction so as to translate the board positioning member past a location in the horizontal plane where the board positioning member is in the board optimizing position, the board positioning member is then carried on the flexible rotatable member so as to slideably engage the second flexible guide member. Once guided by the second flexible guide member, the board positioning member is slideably returned in the second direction from the board optimizing position to the first contact position as the board positioning member is carried around the closed loop track into the upstream contact position in the horizontal plane by the rotation of the flexible rotatable member in the vertical plane.

Advantageously, the flexible rotatable member is at least one closed-loop circulating chain mounted on opposed sprockets lying in the vertical plane.

Further advantageously, the board positioning device may include a rigid curved form having a predetermined curvature in a second horizontal plane. The curved form is mounted adjacent the upstream end of the first flexible guide member, for bending thereover of an upstream segment of the first flexible guide member according to the predetermined curvature of the form. The curvature of the form is to minimize an impact force and rebound of the board as the board is urged against the board positioning member by the board ending means.

In one aspect of the present invention, the first and second flexible guide members are flexible fences. The board positioning member may be a planar member mounted onto an inner end, closest to the lugged transfer chain, of an elongate rigid member. The elongate rigid member is aligned in the second direction so as to be generally co-linear with a longitudinal axis of a corresponding board ended against the planar member.

In a second aspect, the coupling means is a pair of rollers mounted along the elongate rigid member for sliding engagement of the upper edge of the first flexible guide member between the pair of rollers, and the guide member engaging means is a trolley mounted to the elongate rigid member. In a further aspect, the elongate rigid member is a sleeve slidably mounted onto a shaft, and the shaft is mounted onto at least one closed loop circulating chain.

BRIEF DESCRIPTION OF THE DRAWINGS

The invention will be better understood by reference to the accompanying drawings, wherein.

DETAILED DESCRIPTION OF THE PREFERRED EMBODIMENT

Figure 1:
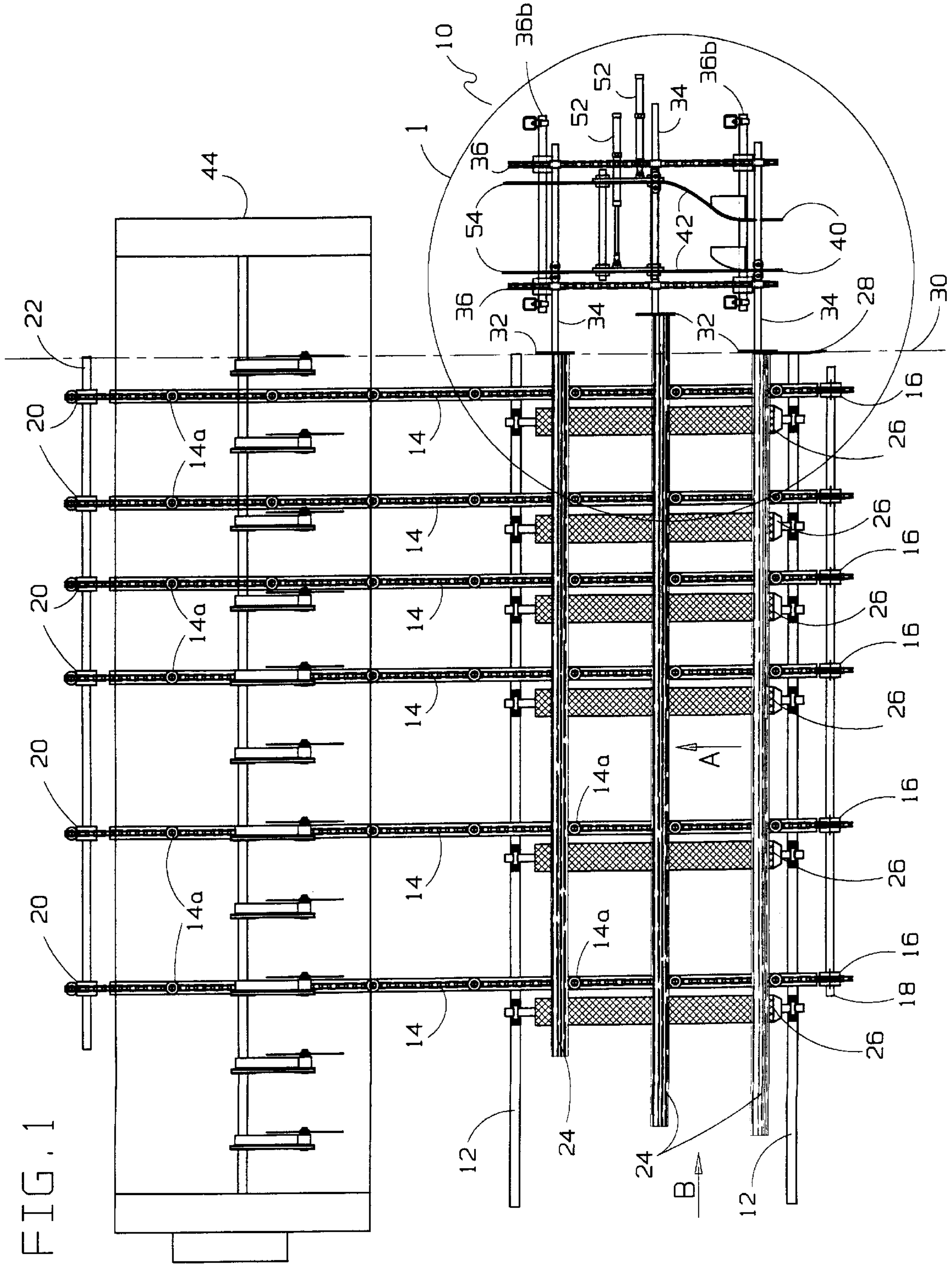
FIG. 1 is a plan view according to a preferred embodiment of the board positioning apparatus of the present invention.

Referring to the drawing figures wherein similar characters of reference represent corresponding parts in each of several views, the apparatus of the present invention is generally indicated by the reference numeral 10.

As best seen in FIG. 1, a support frame constructed of various vertical and horizontal structural supports 12 supports a plurality of lugged transfer chains 14. Transfer chains 14 are driven, at their upstream end, on transfer chain sprockets 16. Drive sprockets 16 are mounted on transfer chain drive shaft 18. Transfer chains 14 are mounted at their downstream end on transfer chain idler sprockets 20. Idler sprockets 20 are mounted on transfer chain idler shaft 22. Transfer chains 14 transfer boards 24 on lugs 14*a* over ending rolls 26 longitudinally, relative to the transfer chains, in direction A. The boards lie laterally across the transfer chains. Ending rolls 26 rotate so as to urge boards 24 laterally in direction B.

Figure 4:
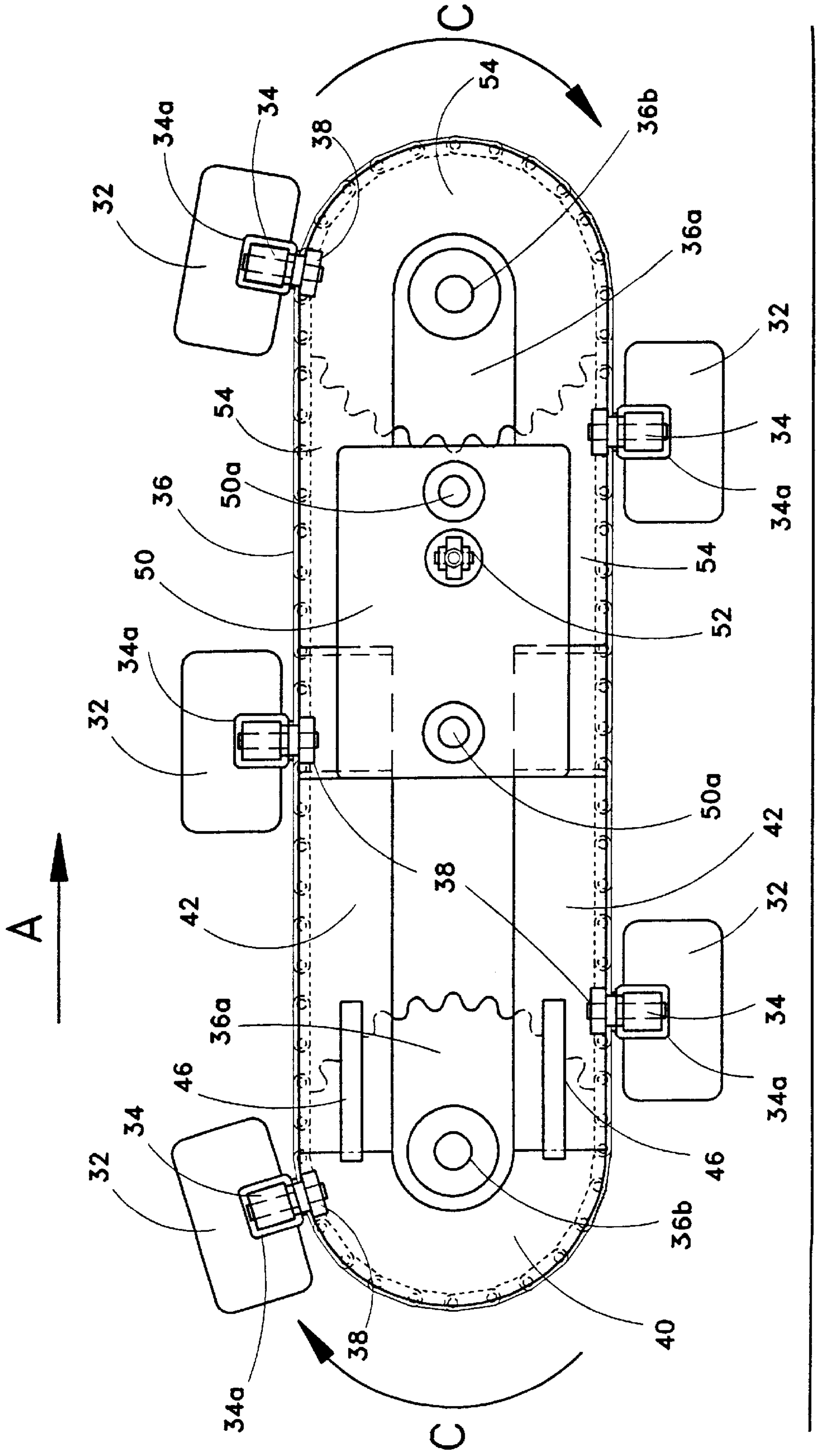
FIG. 4 is an enlarged, fragmentary, side sectional view of the board positioning apparatus taken along line 4—4 of FIG. 2.

The circulating paddle positioning fence 10 best seen in the remaining FIGS. 2–5, is positioned just out side of lugged transfer chains 14, that is, mounted laterally offset from the transfer chains. Ending fence 28 is positioned generally so as to be longitudinally aligned with lumberline 30. Boards 24 are ended against ending fence 28. Ending fence 28 is adjacently upstream to positioning fence 10. Ending fence 28 may be a short vertically planar elongate plate member. A plurality of circulating positioning paddles 32 cooperate with ending fence 28 to take over the ending of boards 24 from ending fence 28 as boards 24 are translated downstream in direction A. Paddles 32 may be planar members such as rigid plates rigidly mounted perpendicularly onto the ends of shafts 34, that is, the ends of the shafts closest to the transfer chains. Shafts 34 are slidably mounted to a pair of parallel circulating chains 36 journalled through bushings 34*a*. As best seen in FIG. 4 circulating chains 36 run on sprockets 36*a*. Sprockets 36*a* are mounted on shafts 36*b*.

Each shaft 34 has a pair of followers 38 mounted in side-by-side relation along the shaft. Followers 38 may be rollers. One of the rollers may be resilient to allow rolling passage past uneven joints, for example in the transition from the flexible track 42 to the trolley 50. Followers 38 are spaced apart along shaft 34 so as to snugly accept therebetween a flexible track 42. Followers 38 are mounted on each shaft 34 on a side of each shaft 34 so as to be radially inwardly disposed on circulating chains 36 as shafts 34 are circulated on circulating chains 36. As shafts 34 are circulated in direction C on circulating chains 36, followers 38 first follow along fixed tracks 40, then followers 38 follow flexible tracks 42. The flexible tracks 42 are mounted to the fixed tracks 40. The fixed tracks 40 are mounted to coincide so that the followers 38 on the shafts 34 and the paddles 32 move to meet and pick up the boards from the ending fence 28 at the lumberline 30. Shafts 34 are extended, which may be to their maximum travel, to reach lumberline 30 adjacent the downstream end of ending fence 28.

Figure 2:
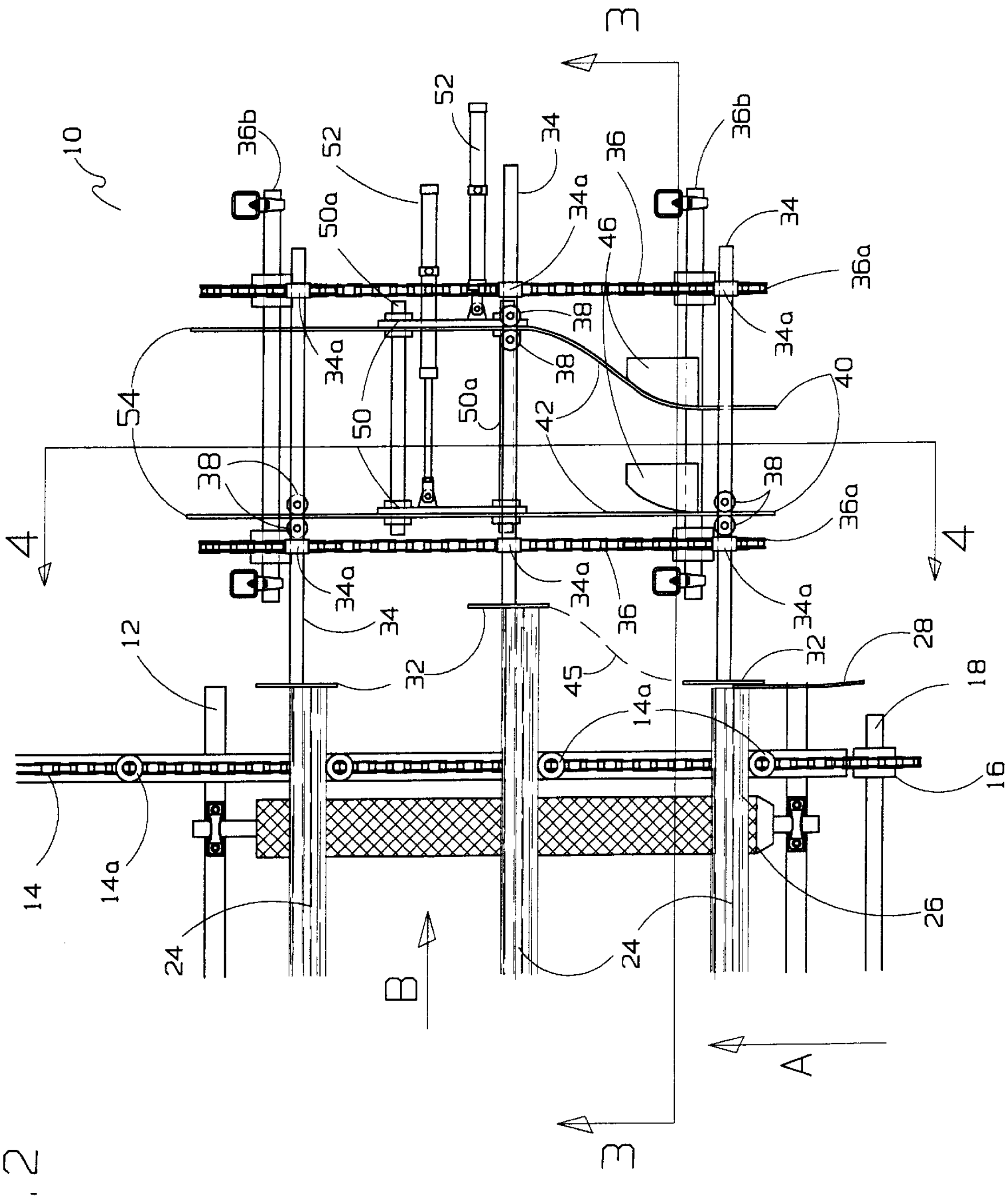
FIG. 2 is a enlarged plan view taken from FIG. 1.
Figure 2A:
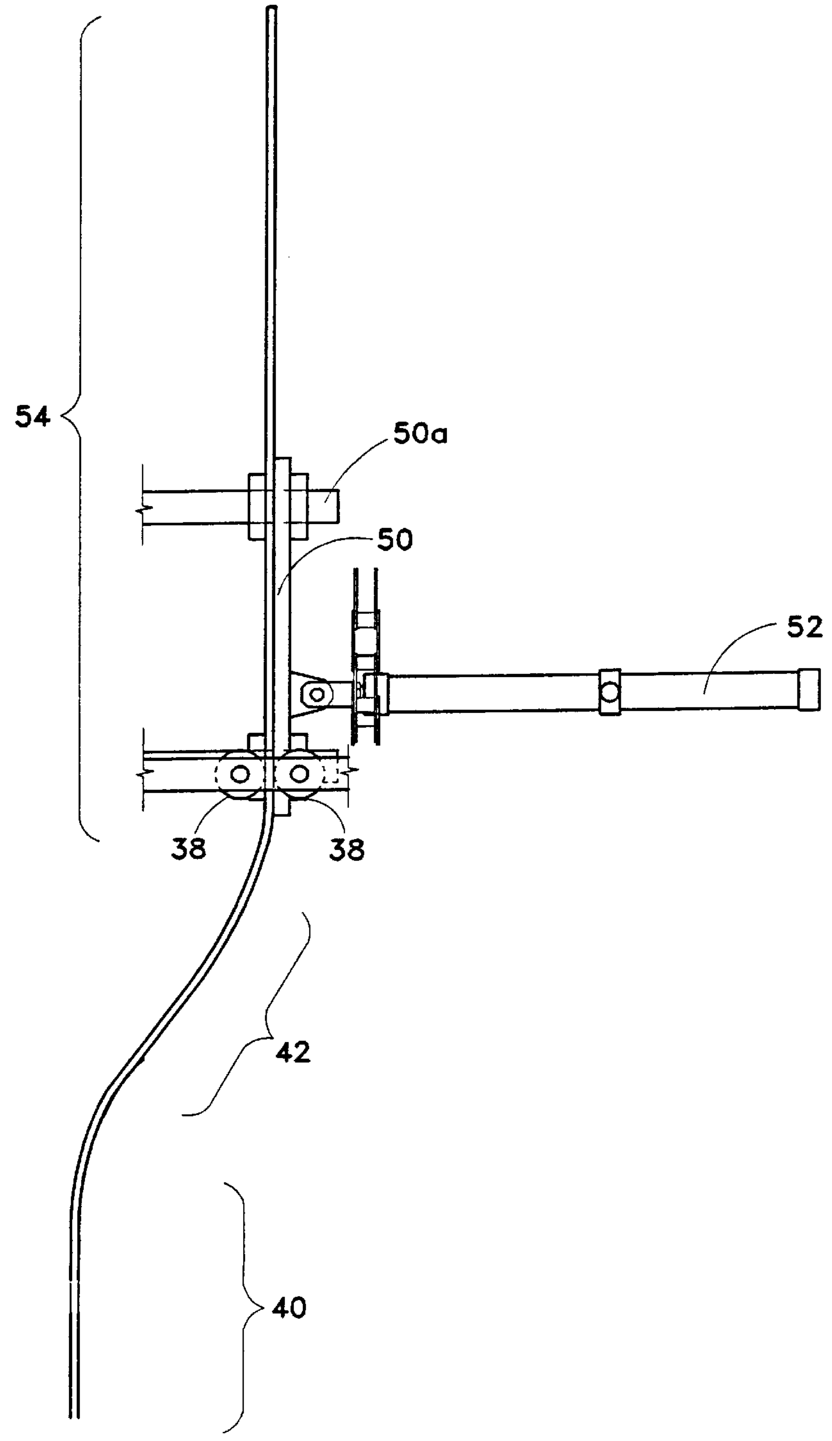
FIG. 2*a* is an enlarged view of the track of FIG. 2.
Figure 3:
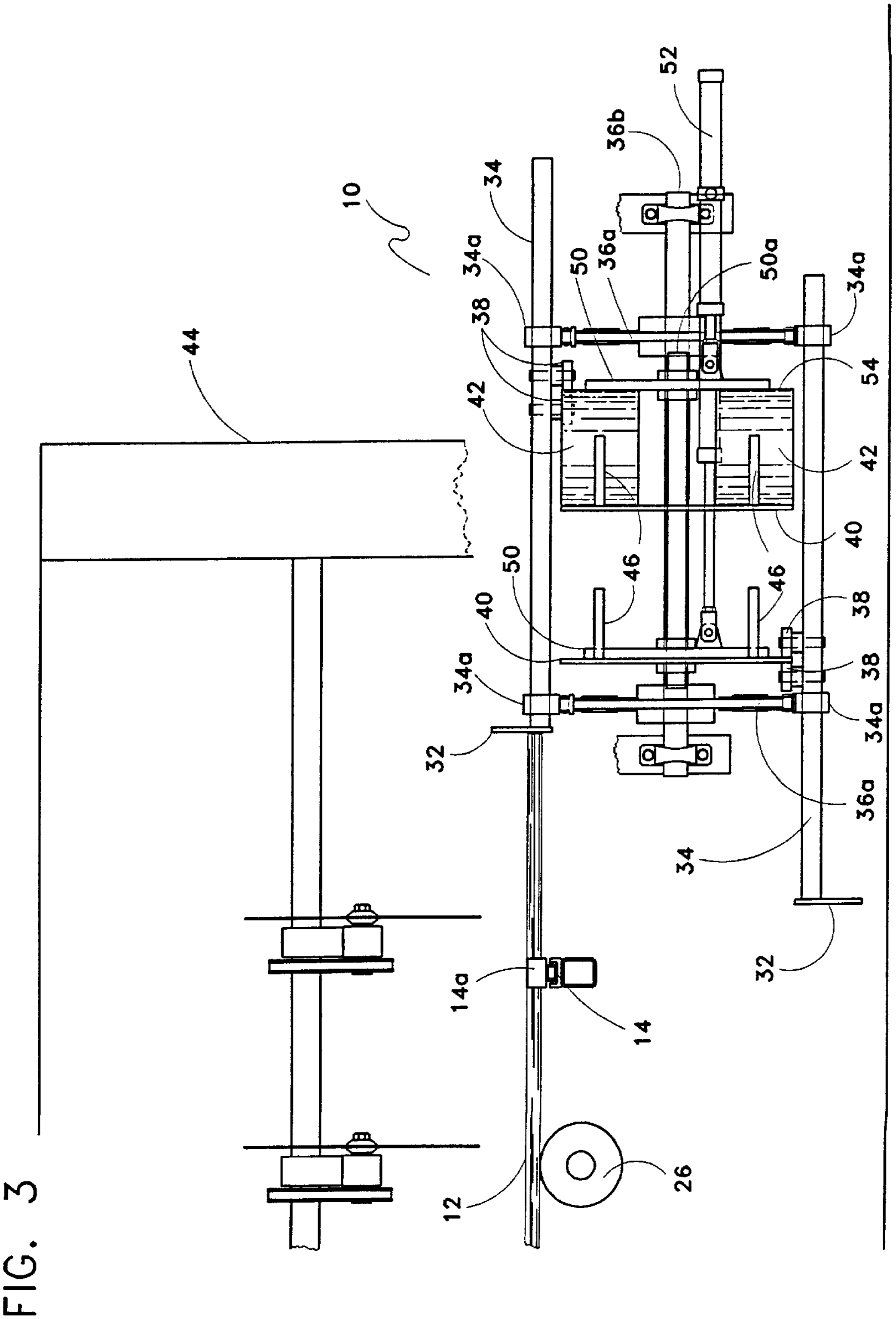
FIG. 3 is a sectional elevation view of the board positioning apparatus taken along line 3—3 of FIG. 2.

As better seen in the enlarged view of FIG. 2*a*, the track along which followers 38 run has flexible track 42 bounded on the upstream and downstream ends by fixed tracks 40 and 54 respectively. To help ensure that the end of boards 24 maintain contact with paddles 32, as boards 24 are urged by ending rolls 26 concurrently towards trimmer 44 and laterally towards paddles 32, flexible track 42 forms a parabolic-like or other shaped curve that helps boards 24 follow a corresponding path 45 along which paddles 32 are moving. To help in forming the shape of the curve flexible track 42 takes as it is positioned, fixed shape rigid curved forms 46 may be mounted laterally behind flexible track 42, adjacent where flexible track 42 is mounted to fixed track 40.

The downstream end of flexible track 42 is mounted to lineal actuated trolley 50. Trolley 50 is actuated by linear cylinder 52 to selectively adjust the lateral position of trolley 50. Trolleys 50 are guided along their lateral translation by rods 50*a*.

Paddles 32, on shafts 34, are translated along flexible tracks 42, that is, the downstream end, on to rigid tracks 54. Rigid tracks 54 are mounted to trolleys 50 at the outfeed end of positioning paddle apparatus 10. Followers 38 follow rigid tracks 54 so that paddles 32 hold their set position as boards 24 are translated off the ending rolls 26 and clear of paddles 32.

Figure 5:
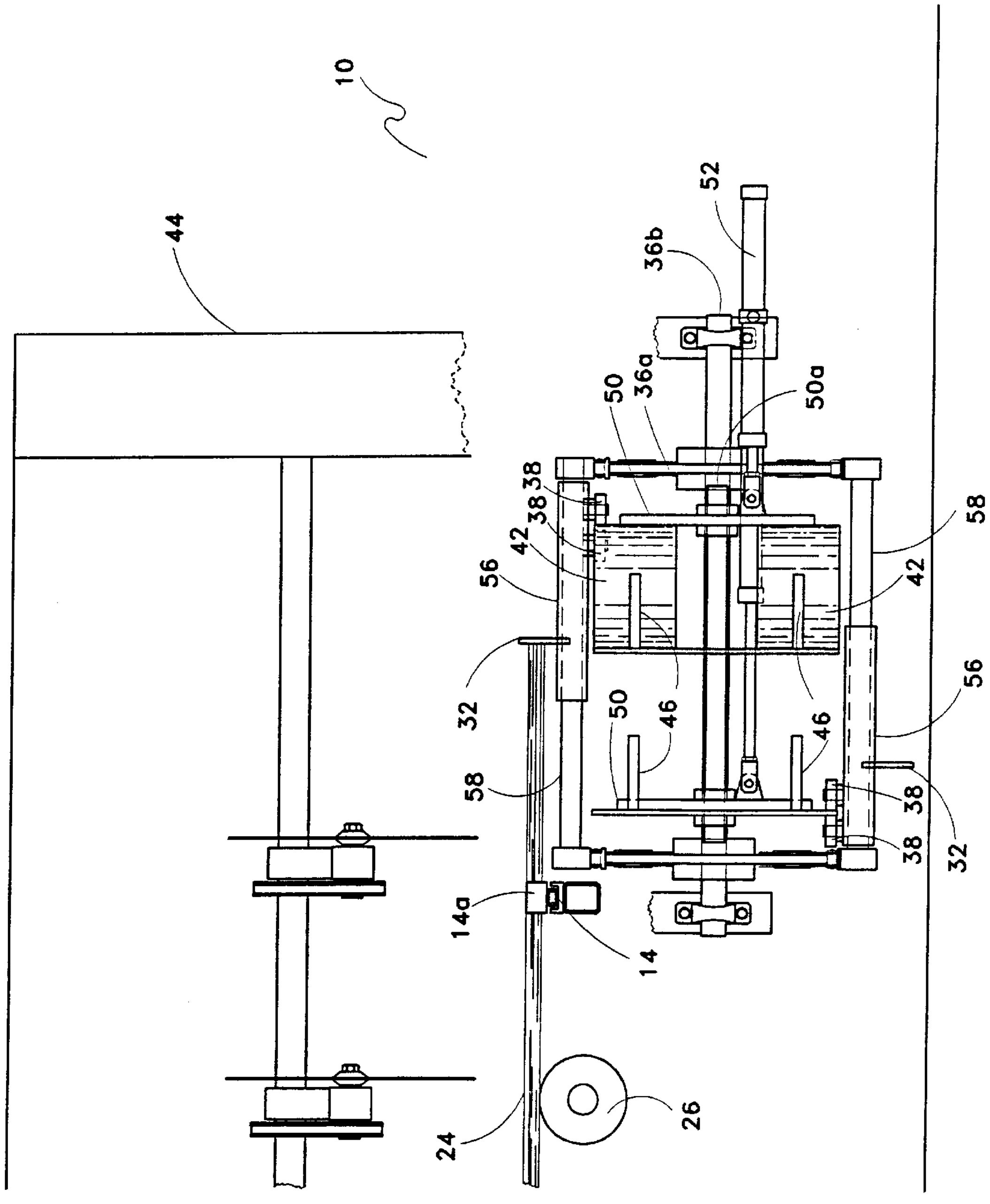
FIG. 5 is an enlarged view of an sleeve to slidably mount the paddle on a fixed circulating shaft.

In a preferred embodiment paddles 32 may be mounted to a slidable sleeve 56 which is slidably mounted to fixed shafts 58. Fixed shafts 58 are mounted on circulating pair of chains 36 so as to extend laterally therebetween. The followers 38 are then mounted onto the slidable sleeves 56 such as seen in FIG. 5.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A board positioning device for longitudinally positioning a board translating from an upstream position to a downstream position in a first direction at a translation speed on a board translating device, wherein said board translating in said first direction is aligned along its length in a second direction perpendicular to said first direction and said board is urged by board ending means in said second direction against a corresponding board positioning member on said board positioning device, wherein said first and second directions lie in a generally horizontal plane, said board positioning device comprising:

(a) a selectively actuable first flexible guide member cooperating with said board positioning member for selectively actuably guiding and positioning in said second direction said board positioning member, (b) a board positioning member translating means for translating said board positioning member in generally said first direction, along a path tangentially parallel to said selectively actuable first flexible guide member, at said translation speed in cooperative alignment with said board so as to align said board positioning member with said board, (c) wherein said board is urged against said board positioning member by said board ending means and said board positioning member is selectively positioned in said second direction by said selectively actuable first flexible guide member to a board optimizing position to thereby selectively position said board at an optimized board position predetermined by optimization means cooperating with said selectively actuable guide member.

2. The board positioning device of claim 1 wherein said selectively actuable first flexible guide member is rigidly mounted at an upstream end thereof adjacent a downstream end of a rigid fence extending parallel to said first direction, and said selectively actuable flexible guide member may be selectively actuated to form a curved guide and said path is correspondingly curved in said generally horizontal plane, and wherein said board positioning member translating means is a flexible rotatable member rotating in a generally vertical plane generally perpendicular to said generally horizontal plane and generally perpendicular to said second direction, said board positioning member perpendicularly slideably mounted to said flexible rotatable member for selective sliding in said second direction, said flexible rotatable member rotating in said vertical plane so as to translate, in said first direction, said board positioning member substantially in said horizontal plane when cooperatively aligned with said board, at said translation speed, while said board is urged in said second direction between a board positioning member engaging position, wherein said board is urged against said board positioning member when said board positioning member is in a first upstream contact position, and said optimized board position, said board positioning member having a guide member engaging means for slideably coupling, by coupling means, said board positioning member to said selectively actuable first flexible guide member.

3. The board positioning device of claim 2 wherein said selectively actuable first flexible guide member has an edge lying generally in said horizontal plane, said coupling means guiding positioning of said board positioning member in said second direction by slideable coupling of said coupling means to said selectively actuable first flexible guide member along said edge while said board positioning member is being carried in said first direction generally in said horizontal plane by said rotation of said flexible rotatable member in said vertical plane.

4. The board positioning device of claim 3 wherein said coupling means slidably couples with a rigid track, as said board positioning member is carried by said flexible rotatable member, contiguous to said edge of said first flexible guide member and curved out of said horizontal plane so as to define a closed loop track in said vertical plane, said coupling means sliding firstly along said selectively actuable first flexible guide member and subsequently along said rigid track in said closed loop track as said board positioning member is carried by said flexible rotatable member out of generally said horizontal plane by said rotation of said flexible rotatable member in said vertical plane, and means for returning said board positioning member from said board optimizing position to said first contact position as said board positioning member is rotated by said flexible rotatable member in said vertical plane around said closed loop track.

5. The board positioning device of claim 4 wherein said means for returning said board positioning member from said optimized board position to said first contact position is a second flexible guide member, mounted parallel to, spaced apart from, said first flexible guide member, for slideable engagement thereon of said board positioning member, wherein as said board positioning member is carried by said flexible rotatable member rotating in said vertical plane in said first direction so as to translate past a location in said horizontal plane where said board positioning member is in said board optimizing position, said board positioning member is carried on said flexible rotatable member so as to slideably engage said second flexible guide member and said board positioning member is slideably returned in said second direction from said board optimizing position to said first contact position as said board positioning member is carried around said closed loop track into said upstream contact position in said horizontal plane by said rotation of said flexible rotatable member in said vertical plane.

6. The board positioning device of claim 5 wherein said flexible rotatable member is at least one closed-loop circulating chain mounted on opposed sprockets lying in said vertical plane.

7. The board positioning device of claim 5 further comprising a rigid curved form, mounted adjacent said upstream end of said first flexible guide member, for bending thereover of an upstream segment of said first flexible guide member according to a pre-determined curvature so as to minimize an impact force and rebound of said board as said board is urged against said board positioning member by said board ending means.

8. The board positioning device of claim 7 wherein said first and second flexible guide members are flexible fences, and wherein said board positioning member is a planar member mounted onto an inner end of an elongate rigid member, said inner end being closest to said board translating device, said elongate rigid member aligned in said second direction so as to be generally co-linear with a longitudinal axis of a corresponding board ended against said planar member.

9. The board positioning device of claim 8 wherein said coupling means is a pair of rollers mounted along said elongate rigid member for sliding engagement of said upper edge of said first flexible guide member between said pair of rollers.

10. The board positioning device of claim 9 wherein said planar members are paddles, and wherein said guide member engaging means is a trolley mounted to said elongate rigid member.

11. The board positioning device of claim 10 wherein said elongate rigid member is a sleeve slidably mounted onto a shaft, wherein said flexible rotatable member is at least one closed loop circulating chain, and wherein said shaft is mounted onto said circulating chain.

12. The board positioning device of claim 9 wherein one roller of said pair of rollers is resilient.

* * * * *